United States Patent
Fanget et al.

(10) Patent No.: US 10,993,039 B2
(45) Date of Patent: Apr. 27, 2021

(54) ACOUSTIC MICROELECTRONIC DEVICE

(71) Applicant: COMMISSARIAT A L'ENERGIE ATOMIQUE ET AUX ENERGIES ALTERNATIVES, Paris (FR)

(72) Inventors: Stephane Fanget, Le Grand Lemps (FR); Caroline Coutier, Grenoble (FR); Philippe Robert, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 161 days.

(21) Appl. No.: 16/469,490

(22) PCT Filed: Dec. 8, 2017

(86) PCT No.: PCT/EP2017/082094
§ 371 (c)(1),
(2) Date: Jun. 13, 2019

(87) PCT Pub. No.: WO2018/108754
PCT Pub. Date: Jun. 21, 2018

(65) Prior Publication Data
US 2020/0007991 A1    Jan. 2, 2020

(30) Foreign Application Priority Data
Dec. 15, 2016 (FR) ...................... 1662470

(51) Int. Cl.
*H04R 31/00* (2006.01)
*H04R 17/00* (2006.01)
(Continued)

(52) U.S. Cl.
CPC ........... *H04R 17/00* (2013.01); *B06B 1/0292* (2013.01); *B06B 1/0666* (2013.01);
(Continued)

(58) Field of Classification Search
CPC .................. H04R 19/04; H04R 31/003; H04R 2201/003; H04R 1/04; H04R 19/005;
(Continued)

(56) References Cited

U.S. PATENT DOCUMENTS 6,669,644 B2    12/2003 Miller
9,006,880 B1 *   4/2015 Minervini .............. H04R 19/04
                                                    257/704
(Continued)

FOREIGN PATENT DOCUMENTS

EP    1 810 619 A1    7/2007
EP    2 500 313 B1    6/2014

OTHER PUBLICATIONS

International Search Report dated Feb. 9, 2018 in PCT/EP2017/082094 filed Dec. 8, 2017.
(Continued)

*Primary Examiner* — Amir H Etesam
(74) *Attorney, Agent, or Firm* — Oblon, McClelland, Maier & Neustadt, L.L.P.

(57) ABSTRACT

An acoustic microelectronic device includes a support, a set of at least one membrane suspended on a face of the support above a cavity by an anchoring zone, and at least one acoustic insulation trench arranged adjacent to the membrane. The device includes at least one bridge connecting the portions of two opposite edges of the trench and located overhanging at least one zone of the trench so as to form, in the zone of the trench, an acoustic insulation box below the bridge.

19 Claims, 7 Drawing Sheets

(51) Int. Cl.
  *B06B 1/02* (2006.01)
  *B06B 1/06* (2006.01)
  *G01N 29/24* (2006.01)
  *H04R 19/00* (2006.01)
(52) U.S. Cl.
  CPC ....... *G01N 29/2406* (2013.01); *H04R 19/005* (2013.01); *H04R 31/006* (2013.01); *H04R 2201/003* (2013.01)
(58) Field of Classification Search
  CPC . H04R 25/00; H04R 1/22; H04R 9/08; H04R 1/086
  See application file for complete search history.

(56) References Cited

U.S. PATENT DOCUMENTS

| | | |
|---|---|---|
| 9,521,499 B2 * | 12/2016 | Theuss ................ H04R 19/005 |
| 2004/0190377 A1 | 9/2004 | Lewandowski et al. |
| 2007/0299345 A1 | 12/2007 | Adachi et al. |
| 2008/0259725 A1 | 10/2008 | Bayram et al. |
| 2011/0213592 A1 | 9/2011 | Adachi et al. |
| 2012/0074509 A1 | 3/2012 | Berg et al. |
| 2014/0073927 A1 * | 3/2014 | Chung ................ A61B 8/4483 600/459 |

OTHER PUBLICATIONS

Ergun, A. S. et al., "Capacitive Micromachined Ultrasonic Transducers: Fabrication Technology," IEEE Transactions on Unltrasonics, Ferroelectrics, and Frequency Control, vol. 52, No. 12, Dec. 2005, pp. 2242-2258.

* cited by examiner

ACOUSTIC MICROELECTRONIC DEVICE

FIELD OF THE INVENTION

The present invention generally relates to acoustic devices, and more specifically, acoustic transducers produced by microtechnology, and in particular, microelectronic and/or nanoelectronic methods. These devices comprise, in particular, in addition to devices for purely acoustic purposes, electronic, micromechanical or electromechanical devices (MEMS, NEMS, etc.).

It relates to membrane acoustic devices, these components could be applied to fields as varied as ultrasound imaging, non-destructive testing, acoustic filters for radiofrequency transmissions, gesture recognition.

This invention proposes a structure, preferably for membrane-based acoustic devices, making it possible for the acoustic insulation of membranes constituting the device.

TECHNOLOGICAL BACKGROUND

Using microelectronic devices is amplified and diversified. Such devices are thus encountered in sectors as varied as medical devices and sensors. In particular, the development of MEMS has generalised opportunities for microelectronics and makes it possible to produce membrane devices of which acoustic transducers, capable of functioning over all acoustic frequencies (ultrasound, audible).

Ultrasound transducers can be used for the following applications: ultrasound probes, contactless interfaces, sonar, medical treatment such as destruction of diseased cells or localised dispensing of medication, fingerprint sensor, communication.

In the audible field, micro speakers can be produced.

Transducers can use various techniques for activating the membrane or for measuring activity of the membrane. One of them uses piezoelectricity. Such a transducer, known under the name, "Piezoelectric Micromachined Ultrasonic Transducer" or under the acronym, "PMUT", generates and/or detects an ultrasound wave by means of a membrane moved by a piezoelectric actuator deposited in a thin layer on the latter to generate the wave and by generating electrical charges in the piezoelectric layer during the detection.

Other transducers obey a capacitive control. Such a transducer, known under the name, "Capacitive Micromachined Ultrasonic Transducer", or under its acronym "CMUT", itself generates and/or detects an ultrasound wave by means of a membrane moved by capacitive effect between the membrane and the bottom of the cavity of the CMUT. Other transducers apply other techniques, such as "thin film bulk acoustic resonator" or "FBAR".

In any case, one or a plurality of membranes is used to form the vibratory mechanical portion. It is suspended above a cavity and connected to the substrate by anchors. It thus produces a mainly bending deformable structure, like a layer. Of course, producing these membranes is, in itself, a technical difficulty regarding the scale of dimension in question, with it being reminded that the thickness of the membrane is often clearly less than 100 microns ($10^{-6}$ m) and generally less than 10 microns. A difficulty is to preserve the mechanical reliability of the suspension of the membrane during the production steps. Another aspect is the acoustic conduction quality of which the homogeneity of the structure-borne transmission of the waves in the membrane and the acoustic insulation of it. Electrical portions must also be constructed (such as electrodes, re-connection elements, inserted insulating layers) and some of these portions engage closely with the membrane (for example, electrodes and the piezoelectric layer of a PMUT transducer).

The membranes must also be as acoustically insulated as possible to avoid the acoustic coupling thereof or damaging vibrations. Regarding this, document US 2004/0190377 A1 describes a method for insulating elements of a sensor network. This publication propose the formation of trenches spacing groups of sensors and forming an acoustic barrier between these groups of sensors. However, a problem thus occurs regarding the electrical connection of sensors, as the trenches are obstacles for the passage of waves, as they are for producing re-connections or other electrical addressing member for sensors.

It is an aim of the invention to overcome at least partially the disadvantages of the current techniques.

SUMMARY OF THE INVENTION

A non-limiting aspect of the invention relates to an acoustic-type microelectronic device comprising a support, a clearance of at least one membrane suspended over a face of the support above a cavity by an anchoring zone, and at least one acoustic insulation trench arranged adjacent to the membrane.

Advantageously, it comprises at least one bridge connecting the portions of two opposite edges of the trench, preferably in order to connect the anchoring zone of the membrane to the support, and located overhanging at least one zone of the trench so as to form, in said zone of the trench, an acoustic insulation box below the bridge.

Thus, the invention ensures an effective acoustic insulation, possibly continuous, around the membrane or several membranes, while making it possible for a simplified electrical connection from the outside of the trench, towards the zone where the at least one membrane is formed.

Another separable aspect of the present invention relates to a method for producing an acoustic-type microelectronic device comprising, based on a support, producing a clearance of at least one membrane suspended on a face of the support above a cavity by an anchoring zone and of at least one acoustic insulation trench arranged adjacent to the membrane, characterised by the fact that it comprises the production of at least one bridge connecting portions of two edges opposite the trench, preferably in order to connect the support to the anchoring zone of the membrane, and located overhanging at least one zone of the trench so as to form in said zone of the trench, an acoustic insulation box below the bridge.

BRIEF INTRODUCTION OF THE FIGURES

Other characteristics, aims and advantages of the present invention will appear upon reading the following detailed description, regarding the appended drawings, given as non-limiting examples, and wherein:

FIGS. 4 to 16 show the potential production steps of the device;

The drawings are given as examples and are not limiting of the invention. They constitute schematic principle representations, intended to facilitate the understanding of the invention and are not necessarily to the scale of practical applications.

DETAILED DESCRIPTION

Before starting a detailed review of embodiments of the invention, below are stated optional characteristics which can possibly be used according to any association or alternatively:

- the trench 62a, b, c, d; 63a, b forms a closed edge around the clearance of at least one membrane 3;
- the bridge 64 is overhanging only one portion of the trench 62a, b, c, d; 63a, b;
- at least one electrical connection element passes over the bridge 64;
- at least one electrode 51 is above the membrane 3 and in electrical continuity with one of the at least one connection element;
- a stack comprises a first electrode 51 in contact with an upper face of the membrane 3, a piezoelectric layer 53 and a second electrode 54, the first electrode 51 being in electrical continuity with a first connection element, the second electrode 54 being in electrical continuity with a second connection element;
- at least one clearance 90 comprises a plurality of membranes 3;
- the device comprises at least one intermediate acoustic insulation trench, between at least two membranes 3 of the plurality of membranes 3.
- at least one superficial portion of the bridge 64 is made of dielectric material;
- at least one superficial portion of the bridge 64 is made of dielectric material forming at least one portion of said dielectric portion 83;
- the device comprises a dielectric portion 83, the dielectric portion being configured to electrically insulate the membrane 3 of the support 1, in particular in the case of a CMUT;
- said dielectric portion 83 is furthermore formed by at least one portion located in the anchoring zone 31 and/or in a border of the membrane 3 connected to the anchoring zone 31;
- the device comprises, according to a specific embodiment, at least two clearances 90 of at least one membrane 3, the clearances 90 being concentric and each surrounded by an annular trench 63a, b.
- the production of the bridge 64 comprises:
  - an etching of a support zone from the face of the support 1, configured to form pillars 72 and/or holes 73 in the zone of the trench;
  - an annealing of the zone of the trench configured to reorganise the material of the pillars 72, and/or respectively of the material around the holes, into a layer oriented parallel to the face 21 of the support 1 and connected to the two opposite edges of the trench 62a, b, c, d; 63a, b.
- further to the etching of the zone of the support 1, a complementary etching is carried out, configured to form a portion of the trench, outside of the zone of the bridge.
- the production of at least one membrane 3 of the clearance comprises:
  - an etching of the support from the face 21 of the support 1, configured to form pillars 71 and/or holes in the zone of the membrane;
  - an annealing of the zone of the membrane configured to reorganise the material of the pillars 71, and/or respectively of the material around the holes 73, into a layer oriented parallel to the face 21 of the support 1 and connected to the support by the anchoring zone 31.
- the production of the at least one membrane 3 and the production of the bridge 64 are simultaneous.
- In particular, for CMUT-type applications, the material of the face 21 of the support 1 can be electrically conductive, and in this case, the method comprises a formation of a dielectric portion 83 by a localised oxidation of the anchoring zone 31 and/or in a border of the membrane 3 connected to the anchoring zone 31 and configured to electrically insulate the membrane 3 of the support.
- the material of the face 21 of the support 1 is electrically conductive, the method comprising a formation of a dielectric layer on an upper face of the bridge 64 by a localised oxidation of the bridge 64.

Of course, the support could also be insulating, even semiconductive (for example, made of silicon), in particular for PMUT-type applications.

Possibly, the following options are also possible:
- the support comprises a superficial layer made of semiconductive material, preferably made of silicon, preferably monocrystalline.
- the trench is at least as deep as the cavity.
- The annealing is carried out at a temperature greater than 800° C., even 1000° C., preferably more than 1100° C. and/or at least 1250° C.
- The annealing is carried out for more than 1 minute and/or less than 30 minutes.
- The device comprises a support 1 and at least one membrane 3 suspended on a face 21 of the support 1 above a cavity 34 by an anchoring zone 31, and it comprises a dielectric portion 83 for connecting the membrane 3 to the support 1, made of a material, separate from that of a main portion 32 of the membrane 3;
- at least one portion of the dielectric portion 83 is located in an anchoring border of the membrane 3 connected to the anchoring zone 31;
- the portion of the dielectric portion 83 located in the anchoring border 31 has a thickness dimension greater than that of the main portion 32 of the membrane 3;
- at least one portion of the dielectric portion 83 is located in the anchoring zone 31;
- the portion of the dielectric portion 83 located in the anchoring zone 31 has a thickness dimension greater than that of the main portion 32 of the membrane 3;
- the dielectric portion 83 is made of an oxide of the material of the main portion 32 of the membrane 3;
- the main portion 32 of the membrane 3 is made of electrically conductive material and wherein the dielectric portion 83 is configured to electrically insulate the main portion 32 of the membrane 3 relative to the support 1;
- the main portion 32 of the membrane 3 is made of monocrystalline silicon;
- at least one acoustic transducer comprises the at least one membrane 3;
- the device according to the invention can comprise, in one same clearance, membranes which could be different (in particular by the sizes thereof to have different acoustic emission frequencies) and/or in different clearances of membranes which could be of identical and/or different forms;

the device comprises at least one clearance of at least one acoustic transducer, each acoustic transducer comprising a membrane 3 of the clearance of at least one membrane 3, which itself is affected.

According to a separable aspect, the method for producing a microelectronic device comprises, on the base of a support, a production of at least one membrane suspended over a face of the support 1 above a cavity 34 by an anchoring zone 31, characterised by the fact that it comprises a formation of a dielectric portion 83 for connecting the membrane 3 to the support 1, made of a material separate from that of a main portion 32 of the membrane 3, by a localised oxidation.

The method is possibly such that:
the localised oxidation is carried out at least on an anchoring border 33 of the membrane 3 connected to the anchoring zone 31;
the localised oxidation is carried out at least on the anchoring zone 31;
the formation of the dielectric portion 83 comprises a masking of a portion of the face of the substrate 2 configured to not show that a surface corresponding to that of the dielectric portion 83 to be formed, then a thermal oxidation from said surface;
the oxidation is produced over a depth at least equal to a thickness dimension of a main portion 32 of the membrane 3;
the production of the membrane 3 comprises:
an etching of the support 1 from the face 21 of the support 1, configured to form pillars 71 and/or holes 73 in the zone of the membrane 3;
an annealing of the zone of the membrane configured to reorganise the material of the pillars 71, and/or respectively the material around the holes 73, into a layer oriented parallel to the face 21 of the support 1 and connected to the support 1 by the anchoring zone 31;
after oxidation, a flattening of the face 21 of the support 1 is carried out.

It is specified that, in the scope of the present invention, the term "on/over" or "above" does not necessarily mean "in contact with". Thus, for example, the deposition of a layer on another layer, does not necessarily mean that the two layers are directly in contact with one another, but this means that one of the layers covers at least partially the other, by being either directly in contact with it, or by being separated from it by a film, also another layer or another element. A layer can moreover be composed of several sublayers of one same material or of different materials.

It is specified that, in the scope of the present invention, the thickness of a layer or of a substrate is measured along a direction perpendicular to the surface according to which this layer or this substrate has the maximum extension thereof.

Using the singular for certain elements of the invention does not necessarily mean that a given element is present in a single manner in the invention. The word "a/an" or "one" does not therefore exclusively mean respectively "a single" or "one single" unless it is arranged otherwise.

Certain portions of the device of the invention can have an electrical function. Some are used for electrical conduction properties and by "connection element" or "electrode" (or equivalent), this means elements formed of at least one material having a sufficient conductivity, in the application, to achieve the desired function. Other portions, on the contrary, are used for electrical insulation properties, and any material having a sufficient resistivity to produce this insulation are concerned and are, in particular, called dielectric.

An aim of the invention is to produce membrane devices, in particular for producing transducers. In the embodiments illustrated and described below, the production of single and individual systems is detailed. It is understood, that the invention can be implemented on plates of the type called wafers for a collective production of a plurality of devices, in particular a plurality of transducers, these plates could then form the subject of a cut to identify the devices in question.

Figure 1:
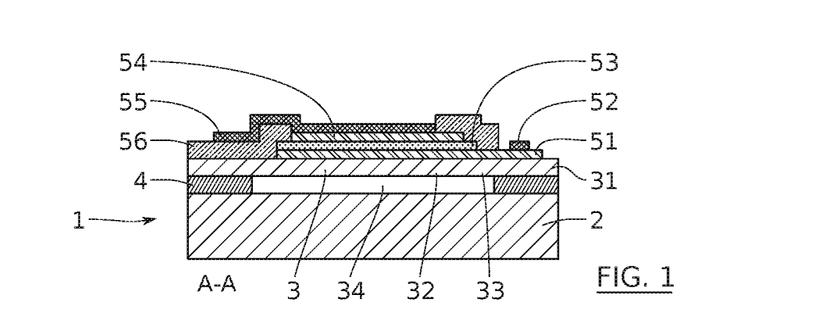
FIG. 1 illustrates an example of PMUT-type transducer according to the state of the art.

FIG. 1 schematically illustrates the technology implemented in a transducer of the PMUT type and to which the invention can be applied. A support 1 forms the base of the membrane device and comprises a substrate 2, for example, made of semi-conductive materials such as silicon. A membrane 3 is suspended on the support 1 above a cavity 34. The cavity 34 here is delimited by a cavity edge 4. For example, the edge 4 can come from a layer of an insulating material, for example silicon dioxide, layer wherein the cavity 34 has been hollowed, for example by a dry or wet etching. According to the state of the art, above the edge 4, anchoring zones 31 connect the membrane 3 to the remainder of the support 1. The anchoring zone 31 is the portion of the support 1 to which the mobile portion, the membrane, is connected. The anchoring zone 31 can be continuous or not around the membrane 3. The membrane 3 here is a portion, of which the lower face is facing the cavity 34, of a layer comprising moreover the anchoring zones 31. The layer from which the membrane 3 comes can be made of dielectric or conductive materials according to the method of production. The membrane 3 comprises a main portion 32 extending preferably towards the centre thereof and a border portion 33 forming a portion for connecting the membrane 3 to the anchoring zone 31 surmounting the edges 4 of the cavity 34.

Due to the suspension thereof, the membrane 3 is likely for a mobility, for example by vibration along a bending direction corresponding to a layer deformation. A stack with an electrical purpose is combined with the membrane 3 so as to produce, in the case of a transducer, a capacity for generating vibratory movement of the membrane 3 or a capacity for detecting such movements. Typically, in the case of a PMUT transducer, the stack of layers comprises, preferably immediately above the membrane 3, a first electrode 51 made of an electrically conductive material, preferably metal. A re-connection 52 offers the option to connect the first electrode 51 to another portion of the device or to the outside, for exchanging electrical signals. These types of transducers function on the basis of an electrosensitive piezoelectric layer. This is arranged above the first electrode 51 and corresponds to the marker 53. The stack is followed by an upper electrode 54 which can, for example, be of the same type of material as those used for the lower electrode 51. Similarly, a re-connection 55 makes it possible to connect the upper electrode 54. Insulating zones 56 make it possible to distinguish these layers and in particular to avoid short-circuits between the portions corresponding to the lower electrode 51 and the re-connection thereof and the portions corresponding to the upper electrode 54 and the re-connection thereof.

The sensor technology given above is not limiting and the invention can be applied to other technologies, in particular to capacitive-type sensors. In any case, separable innovative aspects are proposed, making it possible to improve the production of the membrane and/or elements surrounding it.

Figure 2:
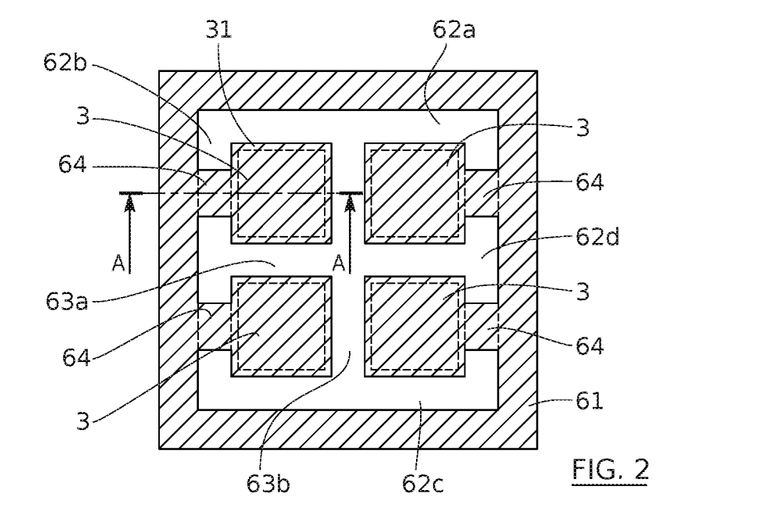
FIG. 2 shows, from above, a first embodiment of the invention

A first aspect of the invention relates to the at least acoustic insulation of the membrane(s) relative to the remainder of the support. In certain applications, in particular of CMUT type, the electrical insulation of the membrane can also be ensured by the invention. In this scope, FIG. 2 illustrates a device comprising acoustic insulation trenches of a specific structure.

In this figure, four membranes 3 are present in the device (this number is not at all limiting) and are each suspended over a cavity 34 by way of an anchoring zone 31. The anchoring zones 31 are not portions directly in the continuity of the remainder of the support, but are, on the contrary, separated from the remainder of the support by one or more trenches. More specifically, the membranes 3 are insulated from a perimeter zone 61 of the support 1 by a peripheral trench. The latter is, in the example, formed by four portions of trenches 62a, b, c, d forming a closed edge so as to continuously insulate the membranes 3 of the perimeter zone 61 of the support. The rectangular or square shape represented is not limiting of the closed edge that can be produced.

Still in the example considered, intermediate trenches 63a, b are furthermore constituted so as to insulate the membranes 3 from one another. In this example, it is to understood that each anchoring zone 31 of each membrane 3 is spaced from another portion of the device by way of a trench fully surrounding it. Although the acoustic insulation would find itself lessened, it is not excluded that the insulation edge formed by the trench(es) is not a closed edge around the membrane system.

Preferably, the depth of the trenches 62a, b, c, d and/or 63a, b, determined according to a thickness dimension of the layers of the support 1, and at least sufficient to reach a level of depth equivalent to the position of a bottom portion of the cavity 34. The trenches generally form elongated grooves in a plane perpendicular to the thickness of the substrate. The length thereof is preferably greater than the width thereof, preferably at least 5 times greater. Preferably, the trenches do not open onto the face of the support opposite the face 21.

Figure 3:
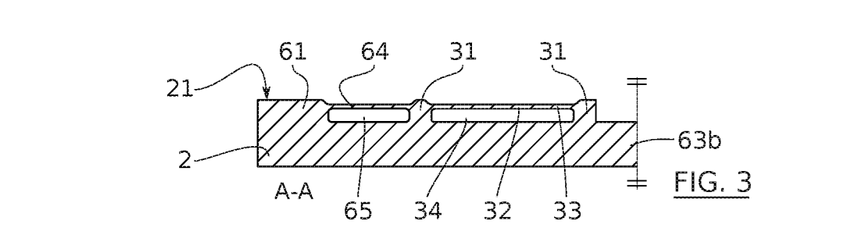
FIG. 3 is a cross-sectional view of it.

This configuration is advantageous in terms of acoustic insulation, but generates a clear difficulty in producing electrical portions, and in particular for the arrangement of the stack of electrodes and/or re-connection due to the hollow relief caused by the trenches. To overcome this, the device of the invention has a bridge 64 equipping at least one membrane system, but preferably all the membrane systems of the device, and making it possible both to conserve the acoustic insulation coming from the trench, but also offering an electrical connection passage. The electrical connection can, for example, be made with an electrode present on the membrane 3; the connection between a connection element and the electrode can, of course, be located, in whole or part, on the membrane 3 or on the anchoring zone 31 or also on the bridge 64 (in particular, according to the size of the electrode). Such a bridge 64 is visible in a top view in FIG. 2 overhanging a trench portion. The bridge 64 can be flush with the level of the upper face 21 of the substrate 2 (or more generally, of the support 1) or be slightly hollow, in particular according to the production necessities, as FIG. 3 shows. The trench considered, as well as the trench portion under the bridge 64 which defines a box 65 preserve or, at the very least, increase the lateral acoustic insulation. In the embodiment of FIGS. 2 and 3, the bridge 64 extends over a relative low portion of the trench surface. An embodiment subsequently provided relates to a complete bridge 64.

Generally, the bridge 64 extends above the trench, so as to join, by one of the ends thereof, the anchoring zone 31 of a membrane 3 and, by the other of the ends thereof, the remainder of the support 1, preferably by joining a side trench wall.

Now, a method for producing the bridge 64 from the material of the superficial support layer 1 is given, for example, on the base of a substrate 2 made of semi-conductive material, preferably silicon, advantageously monocrystalline. It will be seen, moreover, that the membrane 3 can be produced concurrently.

Figure 4:
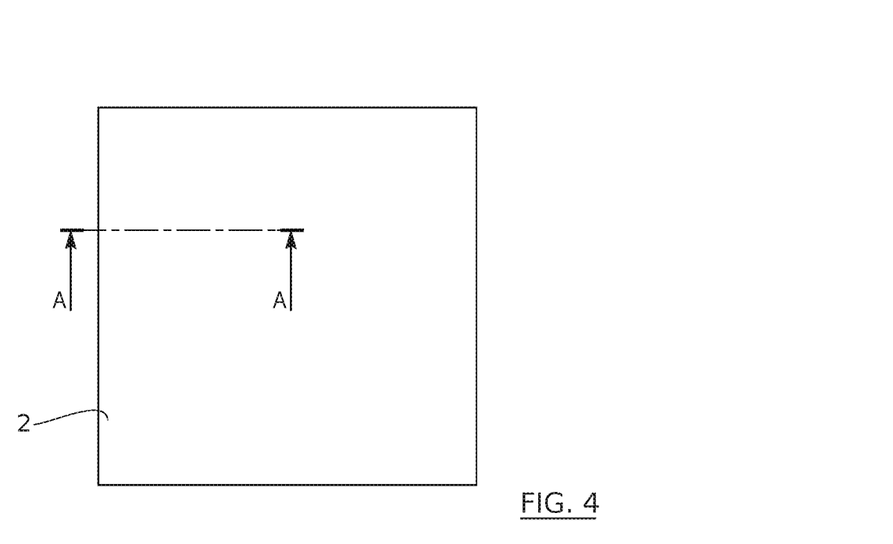
Figure 5:
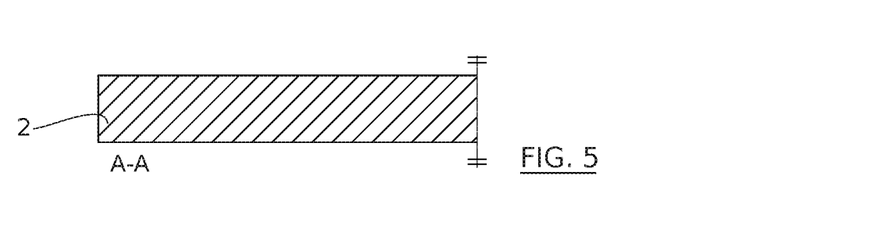

In this scope, the production method can start on the base of a substrate 2, schematically represented in FIGS. 4 and 5. On this base, one or more etching steps are carried out, for example by plasma-based dry etching, so as to produce hollow portions in the substrate 2. The hollow portions correspond, in one portion, to the definition of the trenches 62,a, b, c, d and 63a, b. For another portion, the hollow portions define the material elements which will make it possible to produce the bridges 64 and/or the membranes 3.

Figures 6A, 6B:
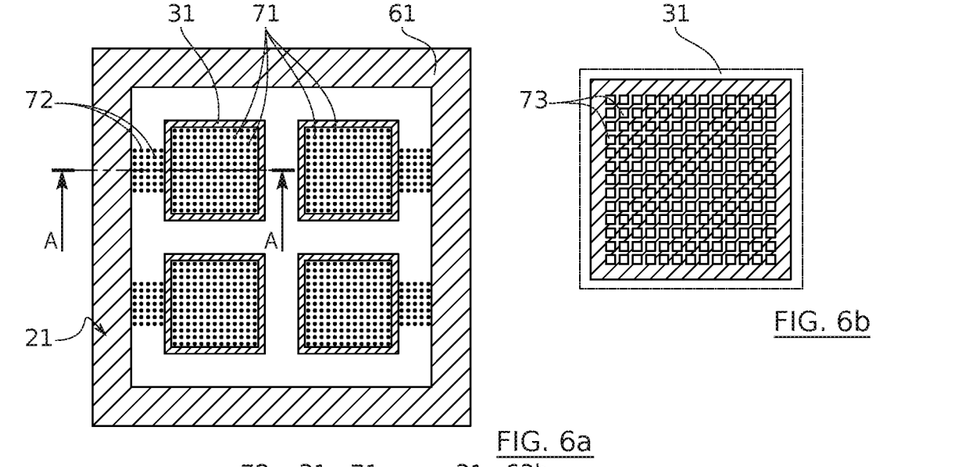

Regarding this last point, FIG. 6a shows that the etching produces a plurality of pillars extending along the thickness direction of the substrate 2 and spaced from one another, advantageously regularly, by removing material provided by the etching. Preferably, the pillars are of one single material over the whole length and protrude over a bottom which will be the cavity bottom or the bottom of the trench.

The edge of a network of these pillars correspond mainly to the edge of the membrane to be formed. The edge of another network of these pillars correspond mainly to the edge of the bridge to be formed.

It is understood that these etchings can be simultaneous or successive. The order thereof is not limiting either. The invention is not limited either by the etching type. In particular, masking steps can be implemented, making it possible to define the patterns to be etched which are not represented.

As an example, the shape ratio between the depth of the pillars and the diameter thereof can be of between 4 and 8. The depth and the size of the patterns thus etched, as well as the localisation thereof defines the shape of the membrane and/or of the bridge, the thickness thereof and the cavity depth. Typically, the depth of the pillars can be of between 1 and 10 microns, and preferably between 3 and 4 micros. The greatest dimension thereof in a plane transversal to the thickness of the substrate 2 (greater width or diameter) can be of between 400 and 1000 nm, and preferably between 500 and 800 nm. The spaces arranged between the pillars can be of the same size. Under these conditions, finally, a bridge thickness and/or a membrane thickness can be obtained of between 1 micron and 3 microns. The pillars can have a circular section in a preferred case.

Figure 7:
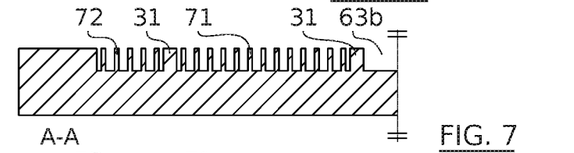

FIG. 7 illustrates, in a cross-section, the result of the etching or etching steps making it possible to produce pillars which are referenced 71 for the pillars making it possible to form the membrane 3 and 72 for the pillars making it possible to produce the bridge 64.

FIG. 6b presents an alternative to the pillars, in the form of holes 73. In this example, a plurality of holes is etched so as to define a grid pattern. However, the shape of the holes is not limiting, even if a square shape is illustrated and the shapes can be, in particular, of circular section. As in the preceding case, networks are thus formed, wherein vacuum zones and material zones are juxtaposed. The examples given above for the pillar shapes and dimensions are applicable directly to the shapes and dimensions of the holes 73. Furthermore, the illustration of FIG. 6b is given for forming a network of holes in view of producing the membrane 3, but a strictly equivalent arrangement is applicable in view of the alternative or cumulative production of the bridge 64. Possibly, certain suspended portions can be produced on the basis of pillar networks and certain others, on the basis of hole networks.

Concerning the network of pillars or holes intended to form a membrane 3, it is produced inside an edge corresponding to that of the anchoring zone 31 which constitutes in this example, an unetched zone of the original substrate 2. In the case of a membrane 3 suspended by only one portion of the perimeter thereof, the anchoring zone only surrounds partially, even only slightly, the membrane 3. Concerning the network of pillars or holes intended to form a bridge 64, it is produced between the anchoring zone 31 of the corresponding membrane and a trench edge.

Figure 8:
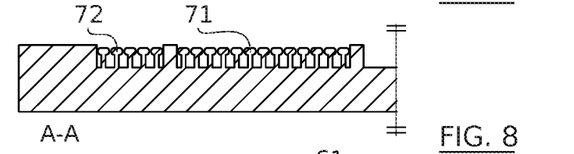

Whether bridges or membranes, the formation of these suspended portions can then be carried out by way of an annealing. The aim is that the atoms of the material intended to form the suspended portion migrate and extend to achieve a minimum energy configuration, bringing them to close the portion which was perforated by the network of pillars or holes. As an example, the annealing temperature can be of between 1100° C. and 1250° C. The time interval corresponding to the annealing can be of between 5 minutes and 30 minutes. The annealing is advantageously non-oxidising. It is preferably formed over all of the substrate so as to produce simultaneously a plurality of suspended portions. For example, in the case of a membrane device and a bridge, the latter portions can be produced simultaneously during one single annealing. Furthermore, if the starting material is monocrystalline silicon, the suspended portions resulting from it are also made of it. FIG. 8 gives an example of a progressive modification of the configuration of the pillars during the annealing. The top of the pillar sag a little and the base of the pillars are progressively disconnected from the bottom of the assembly. The assembly of the material converges towards a layer position, substantially parallel to the bottom and joins the non-etched side edges (those of the trench wall or anchoring zone wall which also delimits the trench).

The annealing will generally slightly lower the level of the suspended portions relative at the level of the face 21 of the substrate 2. If needed, an adjustment of level and/or an adjustment of the thickness of the suspended portion can be carried out, for example by reducing thickness, in particular by a mechanical or mechanical/chemical polishing technique, or according to another example, by increasing thickness, in particular by an epitaxial growth.

In the case of a bridge 64, the underlying box 65 is thus formed without resorting to a sacrificial layer. In the case of a membrane 3, the underlying cavity 34 is thus formed without resorting to a sacrificial layer.

Figure 9:
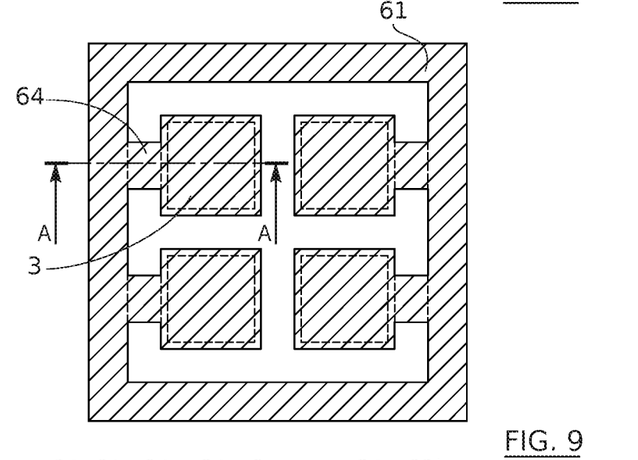
Figure 10:
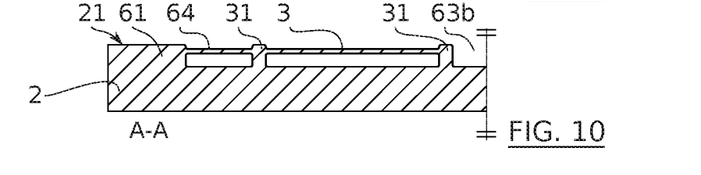

The result of these steps is illustrated in FIGS. 9 and 10 respectively corresponding to FIGS. 2 and 3.

Figure 11:
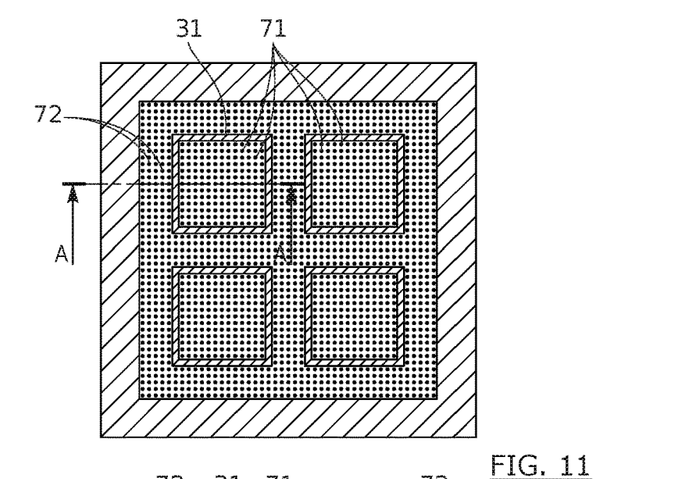
Figure 12:
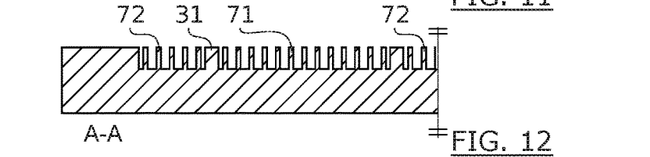
Figure 13:
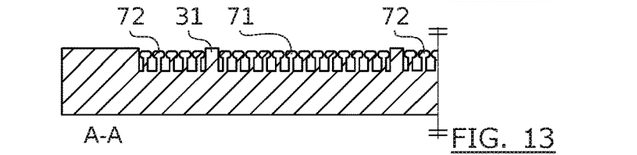

In a variant of the invention, represented in FIG. 11, it is sought to produce a bridge 64 which extends over all of the trench surface. To achieve this, a network of pillars or a network of holes is generated over all of the corresponding trench surface. It is understood that the annealing will cause a suspended portion of complete coverage of the trenches. In the case of FIG. 11, for both the peripheral trench 62a, b, c, d and the intermediate trenches 63a, b are intended to be covered. Of course, only one portion of these trenches could be covered. Correspondingly, FIG. 12 gives a cross-section showing that the pillars, in this example, are created on the two trench sections visible in this view. Correspondingly, to FIG. 8, FIG. 13 illustrates the movement of material during the annealing. Outside of the localisation differences of the holes and/or the pillars, the details given in reference to the preceding embodiment are applicable.

Figure 14:
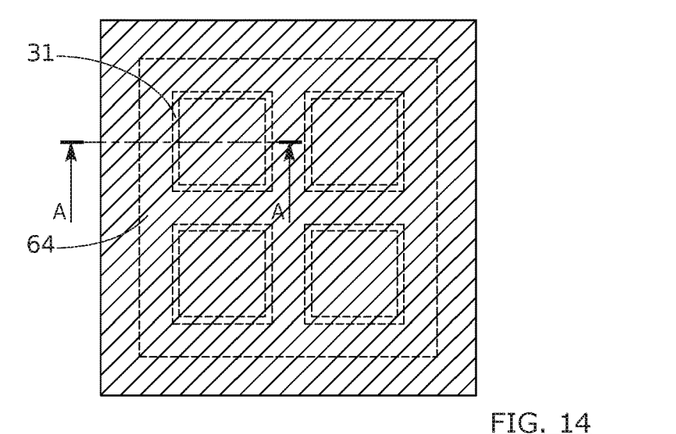
Figure 15:
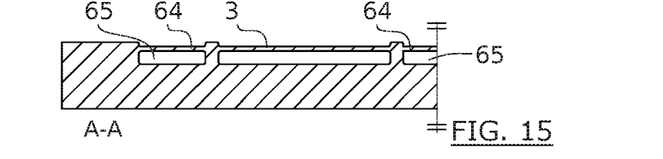

FIG. 14 and FIG. 15 present the result of these steps with trenches which cannot be seen from the face 21 of the substrate. It is understood, that access to the upper surface of the membranes is greatly facilitated in such an arrangement.

Figure 16:
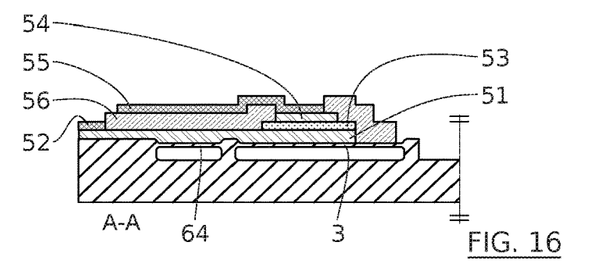

Whether the bridge 64 is complete or only partial at the trench surface, it enables a facilitated electrical connection above the surface of the bridge. Thus, in the case of FIG. 16, a deposition of a conductive material, preferably metal, has been carried out so as to cover at least one portion of the upper surface of the membrane 3 and to extend above the bridge 64. Possibly, other layers can extend parallel or superposed above the bridge 64, like in the case represented with a PMUT transducer.

It will be noted, that in an aspect of the invention, the material of the membrane 3 can be conductive, in particular, monocrystalline silicon, such that the membrane 3 itself can form a portion for an electrical purpose. In this sense, it can be sufficient to produce a re-connection element so as to electrically connect the membrane to achieve the connection above it. It is particularly the case for the implementation of a capacitive technology of the CMUT transducer type, of which an example is given below.

Another aspect of the invention relates to the formation of dielectric portions in the proximity of the membrane and/or in a portion of it. An interest of this aspect is to make it possible to correct possible negative effects of the method described above for the production of the membrane 3. Indeed, by the method for etching the network of pillars or holes then annealing, an irregularity in the section of the membrane is generally observed in the zone of it, which is connected to the anchoring zone 31, i.e. at the level of the border 33 thereof. More specifically, this border will typically have a narrowing of the thickness thereof. This causes a mechanical weakening of the suspended fixing of the membrane 3 relative to the remainder of the support 1. The aspect of the invention now described offers a solution to this problem. Complementarily or alternatively to resolving this problem, this aspect of the invention makes it possible for the electrical insulation of the membrane relative to the remainder of the support 1, if it is electrically conductive. FIGS. 17 to 23 present an embodiment example of this aspect of the invention to produce at least one dielectric portion. Complementarily or alternatively to resolving the two preceding problems, the following aspect of the invention can be used to generate a buffer zone such that signals of the acoustic type are not transmitted laterally through the dielectric portion produced. Thus, the dielectric portion will form a rupture in acoustic impedance produced by a change of material at the level thereof.

Figure 17:
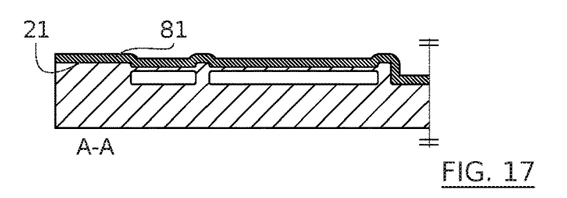
FIGS. 17 to 23 present an option to form an electrical insulation portion.
Figure 18:
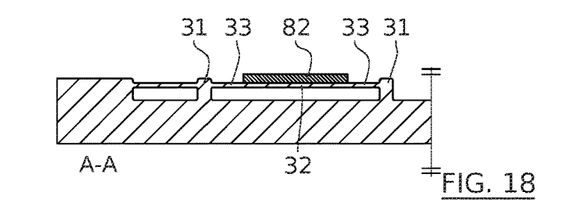

Starting with a device for which the membrane 3 corresponds to the situation illustrated in particular in FIG. 3 or in FIG. 15, the deposition of a masking layer 81 is carried out, as shown in FIG. 17. Advantageously, this is a full plate deposition above the face 21 of the substrate 2. The masking layer can be made of silicon nitride. Certain portions of the layer 81 are then removed by etching, so as to only leave in place portions constituting a mask 82. In the case of FIG. 18, the mask 82 covers at least one portion of the upper surface of the membrane 3. Preferably, however, the mask 82 only extends over one main portion 32 of the membrane, letting an exposed portion subsist at the border 33 of it. The border 33 typically corresponds to a zone of the membrane 3 connected to the anchoring zone 31 of the support.

Figure 19:
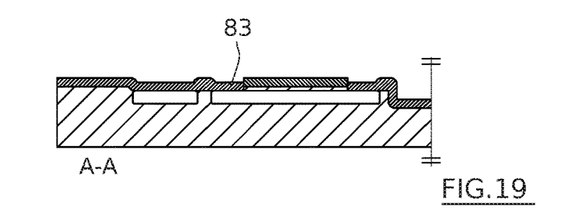

The following step corresponding to FIG. 19 is an oxidation of the material of the superficial layer of the support in the non-masked zones. This oxidation is preferably a thermal oxidation achieved at a temperature advantageously greater than 800° C. and advantageously less than 1250° C., even 1000° C. In particular, it is sought to achieve an oxidised thickness of between 1 micron and 3 microns. This oxidation phase can be wet (typically in the presence of steam) or dry (typically in the presence of dioxygen). The oxidation reactions transform a superficial layer into oxide of the initial material, in particular, silicon dioxide in a preferred case. This reaction produces a localised growth and therefore a thickening of the zones considered. Furthermore, the oxidation generates dielectric zones.

Preferably, the oxidation is carried out under conditions making it possible to oxidise according to a depth making it possible to at the very least, totally oxidise the thickness of the border 33 of the membrane 3 if this was not masked. Cumulatively or alternatively, the oxidation depth can be sufficient to reach, at the level of the anchoring zone 31, at least the depth level corresponding to the lower face of the membrane 3 and advantageously to descend to the level of the bottom of the cavity 34. Generally, it is advantageous to be arranged, such that the oxidation depth makes it possible to produce an electrical insulation between the border 33 of the membrane 3 and the remainder of the support 1 via the anchoring zone 31. Possibly, it is possible to differentiate the oxidation depths by producing a first oxidation face then, by carrying out a second oxidation phase by having removed a portion of the mask 82. The dielectric portion 83 can be produced at least on one from among the anchoring zone 31 and the border 33.

Figure 20:
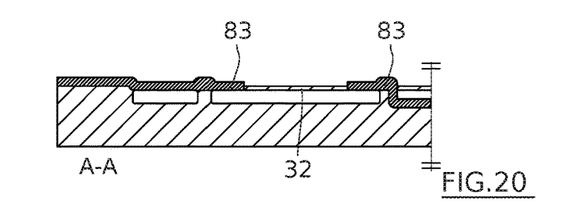
Figure 21:
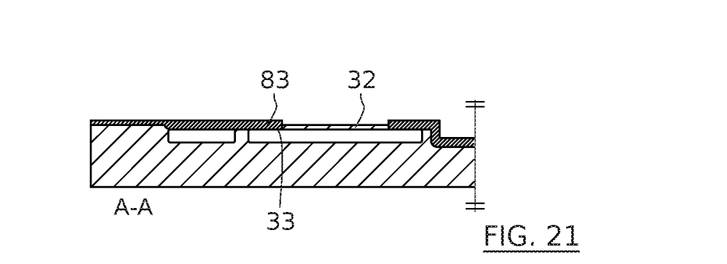

FIG. 20 illustrates a step of removing the mask 82 after oxidation.

Possibly, a levelling, for example, by a mechanical or mechanical/chemical polishing technique can be implemented to reduce the growth and/or the irregularities produced by the oxidation. A result is visible in FIG. 21. The dielectric portion 83 is presented and shows an insulation produced at this level between a main portion of the membrane 32 and the environment of the membrane.

Figure 22:
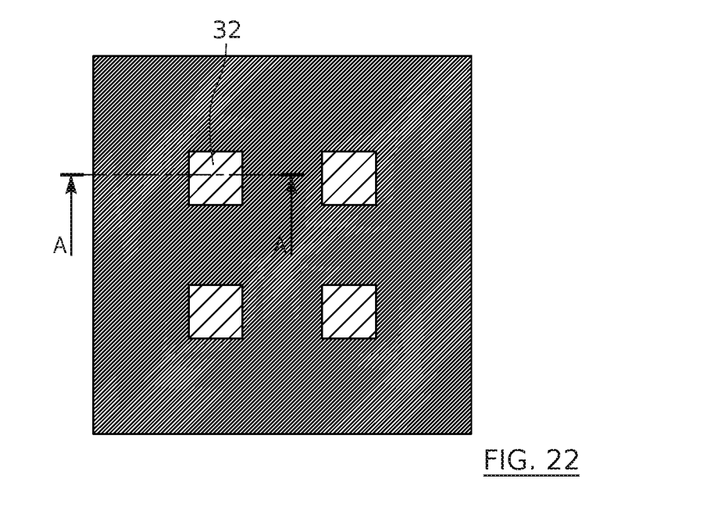

FIG. 22 shows, as a top view, a possible configuration of the device obtained after the oxidation and removal of the mask. In this scenario, the whole of a peripheral portion surrounding the membranes 3 has been oxidised. This case is not limiting and at the very least, a portion for connecting the membrane 3 to the support 5 will comprise the dielectric portion considered coming from the oxidation phase.

In the case of a capacitive transducer, in particular of the CMUT type, the preceding oxidation makes it possible to insulate the main portion 3 of the membrane which, if it is made of conductive material, can form one of the electrodes of a capacitive stack. Typically, the membrane can constitute an upper electrode opposite a lower electrode formed by the bottom of the cavity 34. The cavity 34 itself forms an air-gap. It will be noted, that the cavity produced by the invention can be produced under air vacuum and therefore can have a significant vacuum level, so as to improve the dielectric characteristic thereof. In this scenario, it is sufficient to electrically connect the membrane 3 to the adapted electrical equipment, for example in the form of the deposition of a conductive trace, preferably metal, here illustrated in the form of a lower electrode 51, but which can be simply a re-connection.

Figure 23:
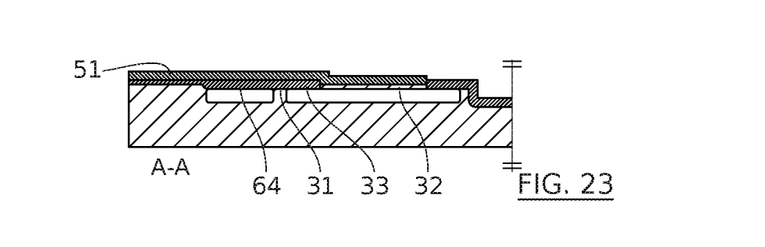

Preferably, the oxidation carried out by the preceding aspect of the invention covers all of the surface 21 of the support intended to receive the conductive trace considered. In the example of FIG. 23, the dielectric portion indeed extends, not only over a border portion 33 of the membrane 3 and over the anchoring zone 31, but also above the bridge 64 and a portion of the perimeter zone 61.

Figure 24:
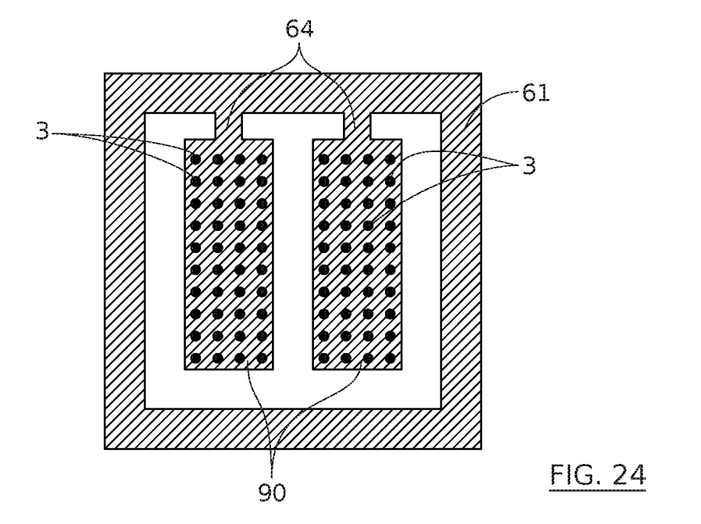
FIGS. 24 and 25 illustrate two possible device configurations.

FIG. 24 gives another configuration example of the device of the invention. In this case, the device comprises a plurality of sets of membranes 3. A first set of membranes 90 is connected by a bridge 64 to a perimeter zone of the device. Likewise, the other set 90 is connected by another bridge 64. The membranes 3 can be produced by the method described above by implementing at least one aspect from among the production of suspended portion by annealing and producing dielectric portions by oxidation. The membranes 3 of a set 90 can be insulated from one another by the trenches, covered or not by bridges, or not be insulated.

Figure 25:
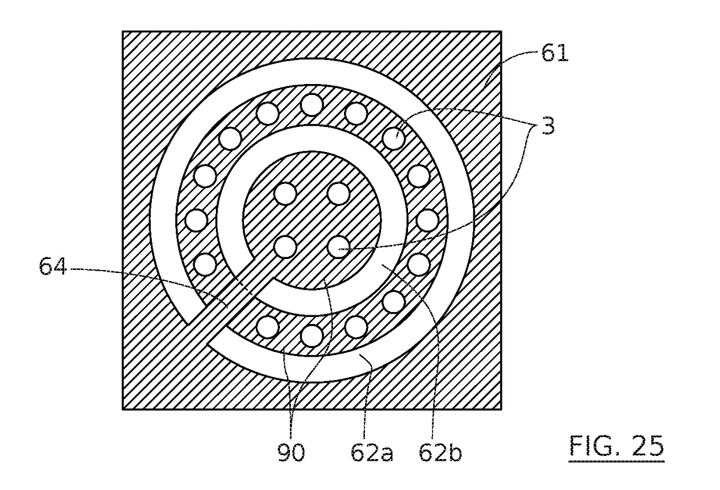

Alternatively, the configuration of FIG. 25 is possible. Two sets 90 of membranes 3 are also presented, but they are, this time, organised concentrically. The inner set 90 is separated from the outer set 90 by way of a trench 63b. The outer set 90 is separated from the remainder of the support by a trench 63a. Each of these sets 90 is electrically accessible by way of a bridge 64 which is, in this single example, to surmount the two trenches 63a, b. The comments made above regarding the embodiment of FIG. 24, concerning the formation of the membranes 3 are applicable to the embodiment of FIG. 25.

It will be noted, that in the preferred embodiments of the invention, no step of returning or removing a sacrificial layer is implemented to produce suspended portions. Furthermore, a limited number of steps are implemented, it all on the base of a substrate 2 which can be a crude monocrystalline silicon substrate.

Except for any specific indication on the contrary, technical characteristics described in detail for a given embodiment can be combined with the technical characteristics described in the context of other embodiments described as (non-limiting) examples, of which those are explained in detail above. The aspects of the invention described can however also each be implemented separately. In particular, the aspects of the invention relating to the formation of dielectric portions, preferably by localised oxidation, can be implemented separately from those relating to the acoustic insulation by trenches. This is also the case of the aspect relating to the formation of bridges and/or of membranes from an annealing of pillar material and/or of material around holes which can be considered individually.

REFERENCES

1. Support
2. Substrate
21. Face
3. Membrane
31. Anchoring zone
32. Main portion
33. Border
34. Cavity
4. Cavity edge
51. Lower electrode
52. Re-connection
53. Piezoelectric layer
54. Upper electrode
55. Re-connection
56. Insulating layer
61. Perimeter zone
62a, b, c, d Trench
63a, b Intermediate trench
64. Bridge
65. Box 71. Pillar
72. Pillar
73. Hole
81. Masking layer
82. Mask
83. Dielectric portion
90. Set of membranes

The invention claimed is:

1. An acoustic-type microelectronic device comprising a support, a set of at least one membrane suspended on a face of the support above a cavity by an anchoring zone, and at least one acoustic insulation trench arranged adjacent to the membrane, the device comprising at least one bridge connecting the portions of two edges opposite the trench in order to connect the support to the anchoring zone of the membrane, the bridge being located overhanging at least one zone of the trench so as to form, in said zone of the trench, an acoustic insulation box below the bridge.

2. The device according to claim 1, wherein the trench forms a closed edge around the set of at least one membrane.

3. The device according to claim 1, wherein the bridge is overhanging only one portion of the trench.

4. The device according to claim 1, comprising at least one electrical connection element passing over the bridge.

5. The device according to claim 4, comprising at least one electrode above the membrane and in electrical continuity with one of the at least one connection element.

6. The device according to claim 5, comprising a stack comprising a first electrode in contact with an upper face of the membrane, a piezoelectric layer and a second electrode, the first electrode being in electrical continuity with a first connection element, the second electrode being in electrical continuity with a second connection element.

7. The device according to claim 1, wherein the set comprises a plurality of membranes.

8. The device according to claim 7, wherein the device comprises at least one intermediate acoustic insulation trench between at least two membranes of the plurality of membranes.

9. The device according to claim 1, comprising a dielectric portion, the dielectric portion being configured to electrically insulate the membrane of the support.

10. The device according to claim 9, wherein at least one superficial portion of the bridge is made of dielectric material forming at least one portion of said dielectric portion.

11. The device according to claim 10, wherein said dielectric portion is formed by at least one portion located in the anchoring zone and/or in a border of the membrane connected to the anchoring zone.

12. The device according to claim 1, comprising at least two sets of at least one membrane, the sets being concentric and each surrounded by an annular trench.

13. A method for producing an acoustic-type microelectronic device comprising, on the base of a support, a production of a set of at least one membrane suspended on a face of the support above a cavity by an anchoring zone and of at least one acoustic insulation trench arranged adjacent to the membrane, the method comprising the production of at least one bridge connecting the portions of two opposite edges of the trench in order to connect the support to the anchoring zone of the membrane, the bridge being located overhanging at least one zone of the trench so as to form, in said zone of the trench, an acoustic insulation box below the bridge.

14. The method according to claim 13, wherein the production of the bridge comprises:
an etching of a support zone from the face of the support configured to form pillars and/or holes in the zone of the trench;
an annealing of the zone of the trench configured to reorganise the material of the pillars, and/or respectively of the material around the holes, into a layer oriented parallel to the face of the support and connected to the two opposite edges of the trench.

15. The method according to claim 14, wherein, further to the etching of the zone of the support, a complementary etching configured to form a portion of the trench outside of the zone of the bridge is carried out.

16. The method according to claim 14, wherein the production of at least one membrane of the set comprises:
an etching of the support from the face of the support, configured to form pillars and/or holes in the zone of the membrane;
an annealing of the zone of the membrane configured to reorganise the material of the pillars, and/or respectively of the material around the holes, into a layer oriented parallel to the face of the support and connected to the support by the anchoring zone.

17. The method according to claim 16, wherein the production of the at least one membrane and the production of the bridge are simultaneous.

18. The method according to claim 13, wherein the material of the face of the support is electrically conductive, the method comprising a formation of a dielectric portion by a localised oxidation of the anchoring zone and/or in a border of the membrane connected to the anchoring zone and configured to electrically insulate the membrane of the support.

19. The method according to claim 13, wherein the material of the face of the support is electrically conductive, the method comprising a formation of a dielectric layer on an upper face of the bridge by a localised oxidation of the bridge.

* * * * *